Patented July 14, 1936

2,047,194

UNITED STATES PATENT OFFICE 2,047,194

MANUFACTURE OF ALCOHOLS

Harold S. Davis and Alfred W. Francis, Woodbury, N. J., assignors to Socony-Vacuum Oil Company, Incorporated, New York, N. Y., a corporation of New York No Drawing. Application March 9, 1934,
Serial No. 714,822

7 Claims. (Cl. 260—156)

This invention is directed to processes for the manufacture of mixed alcohols from petroleum refinery gases containing the corresponding olefins, and more specifically, is directed to the production of ethyl and isopropyl alcohols directly from such gases containing ethylene and propylene.

In the usual manufacture of synthetic ethyl alcohol, ethylene is combined with sulfuric acid forming ethyl sulfuric acid.

$$C_2H_4 + H_2SO_4 \rightarrow C_2H_5SO_4H \quad (a)$$

This reaction can be carried out under many different conditions, as reviewed by Brooks in Chem. Rev. 2, 375–82 (1926). The ethyl sulfuric acid thus formed is hydrolyzed to ethyl alcohol by dilution with water and distillation.

By this method at least one mole and usually a considerable excess of sulfuric acid is required for making one mole of alcohol. Since the recovery and reconcentration of the regenerated acid is laborious and is practically as expensive as new acid, the acid may be considered as consumed. Isopropyl alcohol may be produced by direct hydration of propylene in the presence of 60% sulfuric acid which is generally referred to as a catalyst. The rate of reaction decreases considerably as the reaction proceeds, because the sulfuric acid is diluted by the alcohol formed.

Ethyl and isopropyl alcohol are very similar in physical and chemical properties. Their boiling points 78.5° and 82.3° C. are so close that they cannot be separated readily by fractional distillation, and they can be considered practically inseparable by any means. For most purposes, not including beverages, one alcohol or a mixture of the two is substantially as good as the other.

The isopropyl and ethyl radicals potentially available in petroleum refinery gases offer a convenient and generally a cheaper source of products containing these radicals than other sources, such as the vegetable sources.

The prior art processes are generally open to the disadvantage of slowness of reaction rate, due to dilution of the sulfuric acid by reaction products, to undue consumption of sulfuric acid and to the labor, inconvenience and expense involved in the preparation of the ethyl and propyl compounds required.

It has therefore been an object of this invention to devise a process whereby the ethyl and propyl radicals potentially obtainable from refinery gases can be conveniently converted to commercially useful products, with a minimum of operating steps and equipment. A major object of this invention is the provision of processes whereby the desired introduction of ethyl and propyl radicals from the above mentioned sources into the corresponding alcohols can be had with a minimum use of sulfuric acid. Joined with these are such other objects and advantages as may hereinafter appear.

The present invention may be briefly described as the substantially simultaneous manufacture of a mixture of a plurality of alcohols from the corresponding olefins. The invention may be illustrated by the following procedure for making a mixture of ethyl and isopropyl alcohols which is given as an example of this invention.

Ethyl alcohol is made by intermediate sulfation of ethylene followed by hydrolysis with water as in old processes; but simultaneous with the hydrolysis the propylene is converted by direct hydration to isopropyl alcohol (isopropanol) employing the sulfuric acid generated by the hydrolysis reaction as a catalyst in the hydration reaction. The same sulfuric acid thus serves to hydrate both olefins.

In the practice of the present invention as applied for the production of a mixture of these two alcohols, ethylene is first sulfated by any of the known methods giving ethyl sulfuric acid. It is preferred to carry the absorption of ethylene still further, giving substantial amounts of diethyl sulfate. This is favored by the use of gas rich in ethylene such as is obtainable by absorption and concentration with silver nitrate and extraction with hexane. Pressure also favors the more complete ethylation of sulfuric acid. Advantages to this process in making diethyl sulfate by this procedure are (a) nearly two moles of ethyl alcohol and hence about four or more moles of total alcohol can be made with one of sulfuric acid, and (b) the diethyl sulfate exhibits solvent properties for propylene, and may serve to reduce the necessary pressure, and even if not so used, will assist materially in the retention of the propylene within the reaction system of the present process.

The propylene used is also preferably used in the substantially pure form.

The sulfation product, i. e., ethyl sulfuric acid or diethyl sulfate or a mixture of these compounds is mixed with water and substantially pure propylene in suitable proportions for the following reactions:

$$C_2H_5SO_4H + H_2O \rightarrow C_2H_5OH + H_2SO_4 \quad (b)$$
$$(C_2H_5)_2SO_4 + 2H_2O \rightarrow 2C_2H_5OH + H_2SO_4 \quad (c)$$
$$C_3H_6 + H_2O \rightarrow C_3H_7OH \quad (d)$$

The relative amounts of the two alcohols formed may depend upon the relative supplies of ethylene and propylene available, a suitable proportion being an equimolecular mixture; but any other proportion may be used. It is preferable to use a moderate excess between about 10% and about 50% of water for the above reactions, say preferably about 30%, in order to complete them, and also avoid appreciable formation of ethers, as expressed by the following equations:

$$C_2H_5SO_4H + H_2O + C_3H_6 \rightarrow C_2H_5OC_3H_7 + H_2SO_4$$
Ethyl isopropyl ether or $$2C_3H_6 + H_2O \rightarrow (C_3H_7)_2O$$
Di-isopropyl ether On the other hand too much water should be avoided, because it dilutes the acid and decreases the rate of hydration of propylene.

Since the reagents in this case form two liquid layers, the reaction is carried out preferably in an autoclave with agitation. The temperature may vary over a wide range, say from 50° C. to 150° C., the preferred temperature being 100° C. to 120° C. The pressure varies with the temperature, being that necessary to hold a high concentration between about 0.1 grams-0.4 grams per mol. of propylene in the system, and preferably about 0.3 grams per mol. It is about 700 to 1000 pounds per square inch at the preferred temperatures, and may be summarized as that pressure necessary to maintain the propylene at a density approaching that of a liquid.

The reaction time varies with the temperature and concentration of total sulfuric acid (free and combined with ethylene). A reaction time of one to two hours may be expected under the preferred conditions.

It will be noted that the above preferred temperatures and pressures are within ranges of temperatures and pressures which are bounded upon the one hand by uneconomic slowness of reaction, and upon the other hand, by undesirable reversibilities of the reaction, resulting in decreases of the desired product. The preferred conditions indicated are those which are at present believed to indicate the best balance of conditions for economic recovery of product, economic utilization of raw material, economic reaction times, and economy in equipment investment.

As an example of operation according to the above disclosed process, we give the following data which is of an especial interest in that it demonstrates that the presence of free or uncombined sulfuric acid is not necessary for a desirable recovery of products. In this example the starting mixture is as follows:

Parts by weight
Diethyl sulfate _____ 10.48
Water _____ 5
Propylene _____ 5.2

This reaction mixture is held at a temperature within the range of 84° C. to 95° C., for a time of six hours, and under a pressure of approximately 500 pounds per square inch. At the end of this operation the reaction mixture is found to contain the following:

Parts
Ethyl alcohol _____ 4.91
Isopropyl alcohol _____ 5.82
Isopropylethyl ether _____ 1.81

The remainder of the mixture is comprised of sulfuric acid, water, and unreacted propylene. These yields indicate a hydration of approximately 97% of the propylene present.

The reaction mixture may then be withdrawn from the reaction chamber and the pressure reduced to atmospheric or to any pressure below that at which the reaction has been carried out, which is sufficient to exhaust the unreacted propylene. The remainder of the reaction mixture is then diluted and distilled in accordance with known methods, to recover the mixture of isopropyl and ethyl alcohols. The ethers which form a separate layer, are separated from the reaction mixture before distillation, and may be purified after known methods.

We claim:
1. The method of making mixed alcohols which comprises bringing at least one of the more easily hydrated olefines corresponding to at least one of the alcohols into intimate contact with a liquid comprising water and an alkyl sulfate mixture corresponding to at least one of the alcohols of the less easily hydrated olefines, maintaining such contact until the mixture of alcohols is formed and separating the alcohols from the remainder of the mixture.

2. The method of making mixed ethyl and isopropyl alcohols which comprises bringing propylene into intimate contact with a liquid comprising water and ethyl sulfates, maintaining such contact until the mixture of alcohols is formed and separating the alcohols from the remainder of the mixture.

3. The method of making mixed ethyl and isopropyl alcohols which comprises bringing propylene into intimate contact with a liquid comprising sulfated ethylene and an amount of water in excess of that required for the hydration of the ethyl and propyl radicals present, maintaining such contact until the mixture of alcohols is formed, and separating the alcohols from the remainder of the mixture.

4. The method of making mixed ethyl and isopropyl alcohols which comprises bringing propylene into contact with a liquid comprising sulfated ethylene and an amount of water thirty per cent in excess of that theoretically required for the hydration of the ethyl and propyl radicals present, maintaining such contact until the mixture of alcohols is formed, and separating the alcohols from the remainder of the mixture.

5. The method of making mixed alcohols which comprises bringing at least one of the more easily hydrated olefines corresponding to at least one of the alcohols into intimate contact with a liquid comprising water and an alkyl sulfate mixture corresponding to at least one of the alcohols of the less easily hydrated olefines, heating the mixture to promote hydration, maintaining upon the reaction mixture a pressure sufficient to keep the olefine at a density at least approaching that of a liquid, maintaining the contact until the mixture of alcohols is formed, and separating the alcohols from the remainder of the mixture.

6. The method of making mixed ethyl and isopropyl alcohols which comprises bringing propylene into intimate contact with a liquid comprising water and ethyl sulfates, heating the mixture to a temperature sufficient for active hydration, maintaining the contact until the mixture of alcohols is formed, and separating the alcohols from the remainder of the mixture.

7. The method of making mixed ethyl and isopropyl alcohols which comprises bringing propylene into intimate contact with a liquid comprising water and sulfated ethylene, heating the mixture to a temperature sufficient for active hydration, maintaining upon the reaction mixture a pressure sufficient to keep the propylene at a density at least approaching that of a liquid, maintaining the contact until the mixed alcohols are formed, and separating the alcohols from the remainder of the mixture.

HAROLD S. DAVIS.
ALFRED W. FRANCIS.